May 10, 1932.  L. S. WILBUR  1,857,750
SHOCK ABSORBER
Filed Sept. 24, 1927  2 Sheets-Sheet 1

May 10, 1932.  L. S. WILBUR  1,857,750
SHOCK ABSORBER
Filed Sept. 24, 1927   2 Sheets-Sheet 2

Witnesses
S. J. Collin
E. J. Murphy

Inventor,
Lawrence S. Wilbur
By Joshua R. H. Potts
his Attorney

Patented May 10, 1932

1,857,750

UNITED STATES PATENT OFFICE

LAWRENCE S. WILBUR, OF EVANSTON, ILLINOIS

SHOCK ABSORBER

Application filed September 24, 1927. Serial No. 221,742.

My invention relates in general to improvements in power reverse gears, and more particularly to a shock absorbing device for a power reverse gear of the type adapted for use with the reach rod of a locomotive.

The object of my invention is to provide a device of the kind described which will maintain the locomotive cut-off in a predetermined, fixed position, and provide a means for cushioning and absorbing shocks delivered from the valve gear.

Another object of my invention is to provide a device of the kind described, which will control the valve motion of the locomotive in a manner to avoid strains, and undue wear of the cooperating mechanism.

A further object of my invention is to provide a shock absorbing device for a power reverse gear which will serve to lighten the operation of and absorb shocks and strains when manual operation is desirable, or essential, by reason of failure of the air control apparatus.

Other objects and advantages of the method and construction employed in my invention will appear in the hereinafter specification when taken in connection with the accompanying drawings, in which Figure 1 is a longitudinal section of a power reverse gear, embodying my invention.

Figure 6 is a side elevation of the quadrant lever locking mechanism for securing the valve motion in fixed position.

Figure 1:
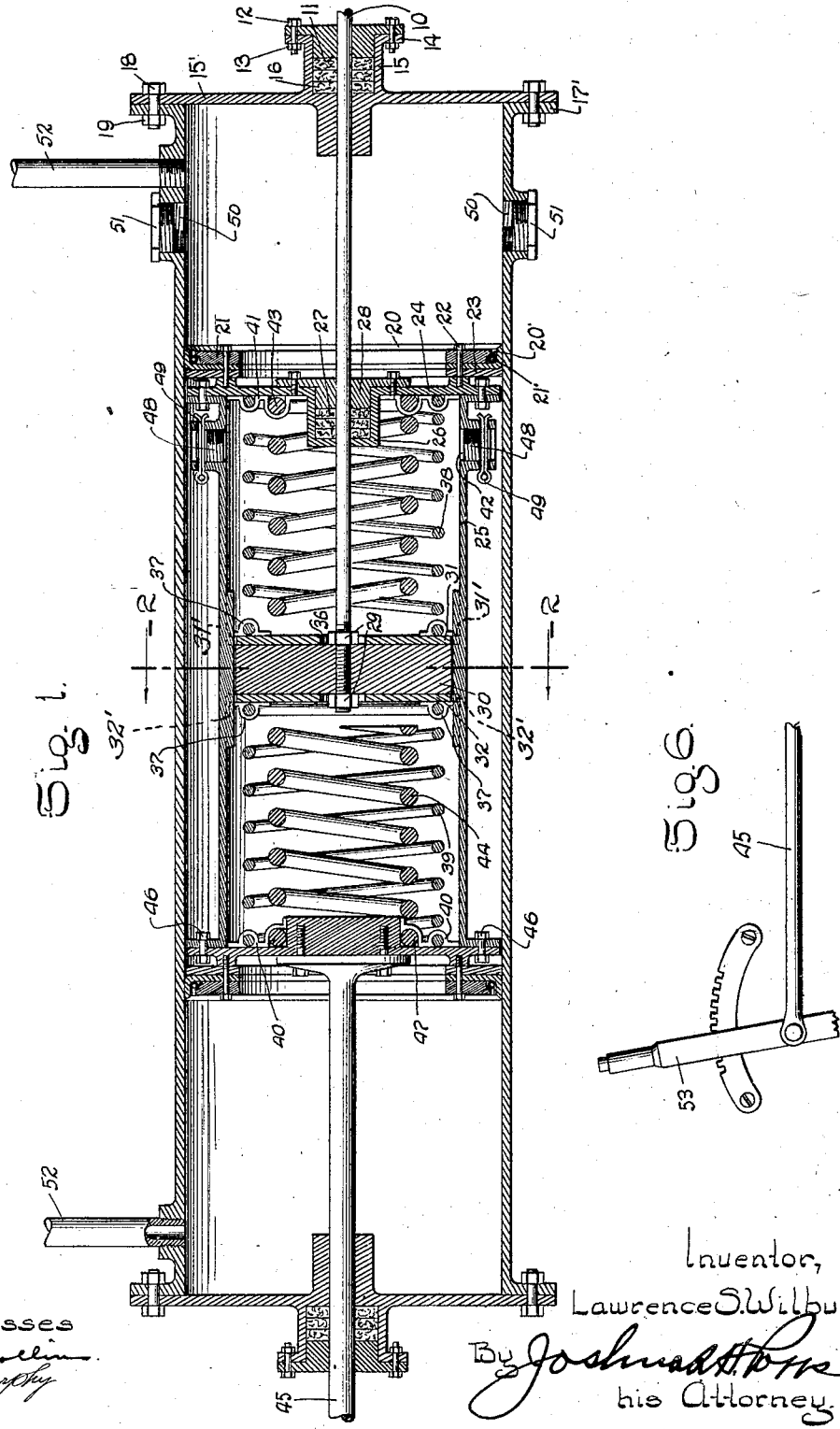
Figure 2:
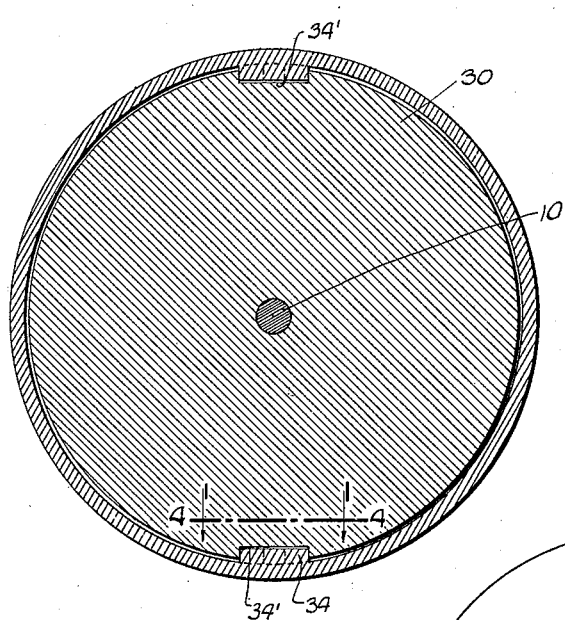
Figure 2 is a cross section taken on line 2—2 of Figure 1.
Figure 4:
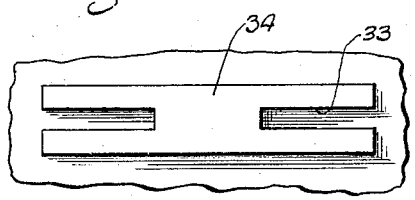
Figure 4 is a plan view of the element coacting with the disk shown in Figure 3.
Figure 3:
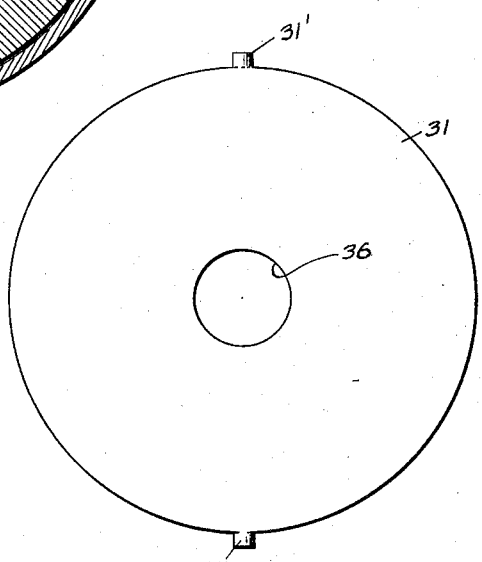
Figure 3 is a plan view of one of the sliding disk members.
Figure 5:
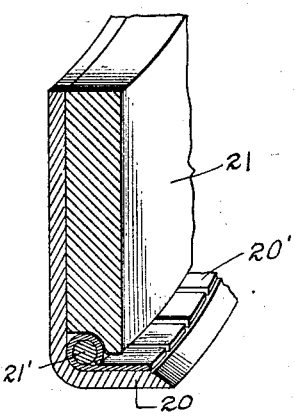
Figure 5 is a detail view of one of the outer piston head members.

Referring more particularly to the drawings in which similar characters of reference apply to like parts in the several figures, 10 is the forward end of a locomotive reach rod passing through a packing member 11 secured by bolts and nuts 12 and 13 to the annular flange 14 of the packing gland 15 which is formed integrally with the removable cylinder head 15', and adapted to receive packing 16. The cylinder head 15' is removably fastened to the flanges of the outer cylinder 17' by the bolt and nuts 18 and 19. After passing into the outer cylinder 17' the forward end of the locomotive reach rod is led through a resilient disk member 20, secured against the face of the annular member 21 by the bolts 22 and resiliently impelled against the walls of the cylinder 17' by the springs 20' on the pin 21'. The bolts 22 pass through annular member 23 and are screw threaded into the head 24 of the inner cylinder 25 which latter is adapted to reciprocate as a piston within the walls of the outer cylinder 17'. The head 24 has an integrally formed cup 26 to hold packing 27 constituting with the packing member 28 a stuffing box for the forward end of the reach rod 10 which latter is fastened by nuts 29 to the inner piston head 30. On either side of the inner piston head 30 are plates 31, 32 having guide projections 31', 32' adapted to ride in grooves 33 of the members 34; the members 34 fitting into the slots 34' of the piston 30. Orifices 36 are provided on plates 31, 32 through which the nuts 29 pass.

On the plates 31, 32 are brackets 37 adapted to retain the coil springs, 38, 39 which serve to maintain the piston 30 in equilibrium in the center of the inner cylinder 25, the other end of the coil springs 38, 39 being adapted to be received by brackets 40, 41 on the head members 47 and 24 respectively, of the rearward end of the locomotive reach rod.

Coaxially situated with reference to the springs 38, 39 are the auxiliary coil springs 43, 44, having ends also retained by brackets 40, 41, the auxiliary springs being adapted to impinge against and resist movement of the plates 31 and 32 when impelled sufficiently forwardly or rearwardly under the thrusts and reactions of the forward and rearward portions of the reach rod, to be engaged by plates 31, 32.

The rearward end 45 of the reach rod is led into the cylinder 17' at its forward end through a structure symmetrical with that disclosed and enumerated at its rearward end, to the head member 47 to which it is secured by bolts 46. The inner cylinder or piston 25 is further provided with ports 42 into which plugs 48 are screw threaded and then secured against turning by cotter pins 49, it being understood that the inner cylinder is filled with liquid which may be replenished from time to time by bringing the parts 47 into alignment with openings 50, removing the cotter pins and plugs and then forcing the quantity of liquid desired, the plugs 48 may then be replaced and secured by cotter pins 49, after which the openings 50 may be closed by caps 51. The pipes 52 leading into the outer cylinder 17' may admit or provide an exhaust for air under pressures and conditions dictated by the engineer,—through the instrumentality of the usual air valve (not shown).

The functioning and mode of operation of my device will now be understood upon referring to the drawings in connection with the following brief explanation.

To position the valves of a locomotive the engineer will, by means of a suitable air valve (not shown) permit air to enter at one end of the piston 25 through either one of the pipes 52 thereby actuating the reach rod. Simultaneously the escape of air under atmospheric pressure in the other end of the cylinder 17' is permitted. When said piston has been placed in the desired position it is locked by means of the quadrant lever 53, and the air valve put in neutral position which permits the exhaust of air under compression to return to atmospheric conditions.

It is to be noted that in actuating the valve motion of the locomotive, the engineer will first operate the air valve, then immediately release the quadrant lever, thereby unlocking the valve motion from set position. Should there be a back thrust from the valve mechanism (not shown) of the locomotive transmitted along the rearward end of the reach rod 10, the piston 30 will contact with the plates 31 and 32, which will move in the guideways 33 of the members 34 against the yielding resistance of the springs 38 and 39 as the said piston moves forwardly and rearwardly until equilibrium is restored. Should the back thrust be of a magnitude sufficient to cause the piston to move the plates 31 and 32 to engage the additional coaxially placed springs 43, 44, the additional and stronger resistance of springs 43, 44, will tend to quickly dampen any extreme thrusts, while the coil springs 38, 39, will restore the piston 30 and consequently the forward end of the reach rod 10 to equilibrium. The cylinder 25 is preferably filled with sufficient fluid to almost fill the entire inner cylinder, preferably leaving, however, a space of one quarter to one half inch between the top level of the oil and the ceiling of the chamber of the inner cylinder 25, this clearance allowing a more free movement of the liquid. The liquid is of a viscosity suitable for cushioning and dampening vibratory motion from the valves of the locomotive through and along the reach rod. By inspection of Figure 1, it will be seen that a clearance space is also provided between the piston 30, the plates 31, 32, and the wall of the inner cylinder 25, this clearance space serving to pass the fluid in the interior of the cylinder from one side to the other of the moving piston 30 and the respective plates 31 or 32 travelling therewith.

It is particularly to be noted that by the construction described, the piston head 30 is always brought back to center position,—the chief purpose of the liquid within the inner cylinder being to prevent sudden rebounds of the piston head back to center against either of the plates 31, 32 which has been left immovable. Without liquid in the inner cylinder, these rebounds might occur with shock detrimental to the parts of the inner cylinder, since the pairs of coaxial springs on either side of the piston head 30 have no effect on their respective impinging plates 31, 32, beyond the immediate center of the inner cylinder 25,—this being due to the action of the guide projections 31' on these plates,—the projections riding in grooves or slots 33 of the member 34, the motion of the piston head 31 being brought to a stop at the center when the projections 31' have passed to the inner end of the grooves or slots 33 on either side of the members 34.

The result above achieved is the maintenance of the locomotive valves in the position desired, with a minimum of the oscillations which occur in mechanisms where the springs on either side of a piston head react, one against the other, this being the method prevalent prior to my invention.

By the method and construction herein illustrated and described, I have been enabled to effect a substantial saving of wear and tear of those cooperating parts of the locomotive which are connected to and co-act with the valve motion of a locomotive. Pounding and straining of the mechanism is obviated, while at the same time the valve motion is maintained in its proper position.

While I have chosen to illustrate the form and construction of my invention by the herein drawings and explanations of same, it is to be understood that changes in the precise embodiment of my invention can be made within the scope of what is claimed, without departing from the spirit or sacrificing any of the advantages of my invention; and hence I do not confine myself to the exact details as set forth, but desire to avail myself of such modifications as come within the scope of the appended claims.

What I claim as new and desire to secure by Letters Patent is:—

1. A shock absorbing device of the character described, comprising an outer cylinder, a cylinder head mounted upon each end of said outer cylinder and provided with a packing gland, an inner cylinder slidably mounted within said outer cylinder, a closed head upon one end of said inner cylinder, a head upon the opposite end of said inner cylinder and provided with a packing gland, an operating rod slidably mounted within a packing gland at one end of said outer cylinder, said operating rod connected to the closed head of said inner cylinder, a piston member slidably mounted within said inner cylinder, and a second operating rod secured to said piston member and slidably mounted within the packing gland on the opposite inner cylinder head and also slidably mounted within the packing gland on the opposite outer cylinder head.

2. A shock absorbing device of the character described, comprising an outer cylinder, a cylinder head mounted upon each end of said outer cylinder and provided with a packing gland, an inner cylinder slidably mounted within said outer cylinder, a closed head upon one end of said inner cylinder, a head upon the opposite end of said inner cylinder and provided with a packing gland, an operating rod slidably mounted within a packing gland at one end of said outer cylinder, said operating rod connected to the closed head of said inner cylinder, a piston member slidably mounted within said inner cylinder, a second operating rod secured to said piston member and slidably mounted within the packing gland on the opposite inner cylinder head and also slidably mounted within the packing gland on the opposite outer cylinder head, and resilient means disposed upon each side of said piston member between said piston member and the inner cylinder heads.

3. A shock absorbing device of the character described, comprising an outer cylinder, a cylinder head mounted upon each end of said outer cylinder and provided with a packing gland, an inner cylinder slidably mounted within said outer cylinder, a closed head upon one end of said inner cylinder, a head upon the opposite end of said inner cylinder and provided with a packing gland, an operating rod slidably mounted within a packing gland at one end of said outer cylinder, said operating rod connected to the closed head of said inner cylinder, a piston member slidably mounted within said inner cylinder, a second operating rod secured to said piston member and slidably mounted within the packing gland on the opposite inner cylinder head and also slidably mounted within the packing gland on the opposite outer cylinder head, and resilient means of varying compressibility disposed upon each side of said piston member between said piston member and the inner cylinder heads.

4. A shock absorbing device of the character described, comprising an outer cylinder, a cylinder head mounted upon each end of said outer cylinder and provided with a packing gland, an inner cylinder slidably mounted within said outer cylinder, a closed head upon one end of said inner cylinder, a head upon the opposite end of said inner cylinder and provided with a packing gland, an operating rod slidably mounted within a packing gland at one end of said outer cylinder, said operating rod connected to the closed head of said inner cylinder, a piston member slidably mounted within said inner cylinder, a second operating rod secured to said piston member and slidably mounted within the packing gland on the opposite inner cylinder head and also slidably mounted within the packing gland on the opposite outer cylinder head, and means for applying fluid under pressure to the interior of said outer cylinder.

5. A shock absorbing device of the character described, comprising an outer cylinder, a cylinder head mounted upon each end of said outer cylinder and provided with a packing gland, an inner cylinder slidably mounted within said outer cylinder, a closed head upon one end of said inner cylinder, a head upon the opposite end of said inner cylinder and provided with a packing gland, an operating rod slidably mounted within a packing gland at one end of said outer cylinder, said operating rod connected to the closed head of said inner cylinder, a piston member slidably mounted within said inner cylinder, a second operating rod secured to said piston member and slidably mounted within the packing gland on the opposite inner cylinder head and also slidably mounted within the packing gland on the opposite outer cylinder head, and a cushioning liquid inclosed within said inner cylinder.

6. A shock absorbing device of the character described, comprising an outer cylinder, a cylinder head mounted upon each end of said outer cylinder and provided with a packing gland, an inner cylinder slidably mounted within said outer cylinder, a closed head upon one end of said inner cylinder, a head upon the opposite end of said inner cylinder and provided with a packing gland, an operating rod slidably mounted within a packing gland at one end of said outer cylinder, said operating rod connected to the closed head of said inner cylinder, a piston member slidably mounted within said inner cylinder, a second operating rod secured to said piston member and slidably mounted within the packing gland on the opposite inner cylinder head and also slidably mounted within the packing gland on the opposite outer cylinder head, means for applying fluid under pressure to the interior of said outer cylinder, and a cushioning liquid inclosed within said inner cylinder.

In testimony whereof I have signed my name to this specification.

LAWRENCE S. WILBUR.